(12) United States Patent
Kim

(10) Patent No.: US 9,378,742 B2
(45) Date of Patent: Jun. 28, 2016

(54) APPARATUS FOR SPEECH RECOGNITION USING MULTIPLE ACOUSTIC MODEL AND METHOD THEREOF

(71) Applicant: Electronics and Telecommunications Research Institute, Daejeon (KR)

(72) Inventor: Dong Hyun Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 13/845,941

(22) Filed: Mar. 18, 2013

(65) Prior Publication Data

US 2014/0180689 A1  Jun. 26, 2014

(30) Foreign Application Priority Data

Dec. 24, 2012 (KR) .................. 10-2012-0151688

(51) Int. Cl.
*G10L 15/32* (2013.01)
*G10L 15/065* (2013.01)

(52) U.S. Cl.
CPC ............... *G10L 15/32* (2013.01); *G10L 15/065* (2013.01)

(58) Field of Classification Search
CPC ...................................................... G10L 15/32
See application file for complete search history.

(56) References Cited

U.S. PATENT DOCUMENTS

| | | | | |
|---|---|---|---|---|
| 5,497,447 | A * | 3/1996 | Bahl et al. ...................... | 704/245 |
| 6,799,162 | B1 * | 9/2004 | Goronzy et al. ............... | 704/244 |
| 8,930,179 | B2 * | 1/2015 | Chang et al. ................... | 704/9 |
| 2010/0312546 | A1 * | 12/2010 | Chang et al. ................... | 704/9 |
| 2011/0161077 | A1 * | 6/2011 | Bielby ........................... | 704/231 |
| 2011/0288867 | A1 * | 11/2011 | Chengalvarayan et al. .. | 704/251 |
| 2011/0301953 | A1 * | 12/2011 | Lee ................................. | 704/243 |
| 2012/0078630 | A1 * | 3/2012 | Hagen et al. ................... | 704/254 |
| 2014/0129218 | A1 * | 5/2014 | Liu et al. ........................ | 704/231 |
| 2014/0324426 | A1 * | 10/2014 | Lu et al. ......................... | 704/242 |

FOREIGN PATENT DOCUMENTS

| | | |
|---|---|---|
| KR | 10-2011-0133739 | 12/2011 |
| KR | 2012-0056086 A | 6/2012 |

OTHER PUBLICATIONS

Beaufays, Francoise et al., "Unsupervised Discovery and Training of Maximally Dissimilar Cluster Models," Interspeech, 4 pages, (2010).
Zhang, Yu et al., "An i-Vector based Approach to Training Data Clustering for Improved Speech Recognition," Microsoft Research, 12th Annual Conference of the International Speech Communication Association, InterSpeech, 4 pages, (2011).
Zhang, Zhipeng et al., "Piecewise-linear transformation-based HMM adaptation for noisy speech," Speech Communication, vol. 42:43-58 (2004).

* cited by examiner

*Primary Examiner* — Douglas Godbold
(74) *Attorney, Agent, or Firm* — Nelson Mullins Riley & Scarborough LLP; Anthony A. Laurentano

(57) ABSTRACT

Disclosed are an apparatus for recognizing voice using multiple acoustic models according to the present invention and a method thereof. An apparatus for recognizing voice using multiple acoustic models includes a voice data database (DB) configured to store voice data collected in various noise environments; a model generating means configured to perform classification for each speaker and environment based on the collected voice data, and to generate an acoustic model of a binary tree structure as the classification result; and a voice recognizing means configured to extract feature data of voice data when the voice data is received from a user, to select multiple models from the generated acoustic model based on the extracted feature data, to parallel recognize the voice data based on the selected multiple models, and to output a word string corresponding to the voice data as the recognition result.

14 Claims, 6 Drawing Sheets

APPARATUS FOR SPEECH RECOGNITION USING MULTIPLE ACOUSTIC MODEL AND METHOD THEREOF

CROSS-REFERENCE TO RELATED APPLICATIONS

This application claims priority to and the benefit of Korean Patent Application No. 10-2012-0151688 filed in the Korean Intellectual Property Office on Dec. 24, 2012, the entire contents of which are incorporated herein by reference.

TECHNICAL FIELD

The present invention relates to a voice recognizing method, and more particularly, to an apparatus for recognizing voice using multiple acoustic models that generates a clustered acoustic model configured as hierarchical classification according to a speaker and an environment based on voice data collected in various environments, selects multiple models from the generated acoustic model based on feature data of voice data received from a user, performs parallel recognition based on the selected multiple models, and outputs a selected word string as the parallel recognition result, and a method thereof.

BACKGROUND ART

As voice recognition is expanded to an online service using a mobile network of a cellular phone, many researches on a configuration of a voice recognition server are also being conducted. In particular, Google has proposed a clustered acoustic model method while introducing a mobile voice recognition search service. A model classification criterion of Google lies in the assumption that weights of a plurality of Gaussians in a model state occupied in an actual environment vary. Accordingly, the proposed method is a method of initially converting collected voice data to a model string through recognition, calculating a distance value between a Gaussian weight of a model state and a Gaussian weight of a model state present in classified centroid as KL-divergence, and thereby classifying the distance value as close centroid. A clustered acoustic model is generated by repeating the above process using a vector quantization (VQ) method. The above method uses an aspect that a Gaussian weight varies based on an acoustic condition, and needs to configure a 2-pass system of initially performing recognition and then determining a model state string in order to use a clustered acoustic model during a recognition process, and does not relatively express well a change of a speaker. In the case of the above method, according to an increase in the number of clustered models generated by classifying data, an amount of data used for modeling decreases.

Microsoft (MS) has also proposed a method of classifying an acoustic model. MS has expressed an eigenVoice vector and an eigenChannel vector as an i-vector by integrating the eigenVoice vector and the eigenChannel vector, which are technologies used for speaker adaptation and speaker recognition, using one equation, and has also proposed that it is possible to express classification with respect to a speaker and a channel by mixing the classification using a single matrix. Acoustic characteristics were hierarchically classified using a difference between i-vectors that are generated to be different for each speech. Here, it is unsuitable to inclusively process a speaker factor, an environmental factor, a channel characteristic, and the like, using one equation. It is unclear to find out whether the clustered acoustic model effect has appeared by simply obtaining an acoustic difference, or has appeared to be robust against a speaker, environmental noise, and the like. The above method also needs to obtain an i-vector value in order to select a classification model and thus, needs to configure a 2-pass recognizing system.

SUMMARY OF THE INVENTION

The present invention has been made in an effort to provide an apparatus for recognizing voice using multiple acoustic models that generates a clustered acoustic model configured as hierarchical classification according to a speaker and an environment based on voice data collected in various environments, quickly performs a pre-generated tree-based Gaussian mixture model (GMM) similarity search based on feature data of voice data received from a user, selects multiple models from an acoustic model based on a hidden Markov model (HMM) corresponding to a GMM, performs parallel recognition based on the selected multiple models, and outputs a selected word string as the parallel recognition result, and a method thereof.

However, the object of the present invention is not limited to the aforementioned matters and other objects not described above will be clearly understood by those skilled in the art from the following description.

An exemplary embodiment of the present invention provides an apparatus for recognizing voice using multiple acoustic models, the apparatus comprising a voice data database (DB) configured to store voice data collected in various noise environments; a model generating means configured to perform classification for each speaker and environment based on the collected voice data, and to generate an acoustic model of a binary tree structure as the classification result; and a voice recognizing means configured to extract feature data of voice data when the voice data is received from a user, to select multiple models from the generated acoustic model based on the extracted feature data, to parallel recognize the voice data based on the selected multiple models, and to output a word string corresponding to the voice data as the recognition result.

The model generating means may include a data constituting unit configured to extract, from the collected voice data, feature vector data to be two types of spectral data and cepstral data; a speaker classifying unit configured to classify the extracted feature vector data based on a speaker, and to generate a binary tree-based speaker centric hierarchical model including a speaker classification HMM group, a speaker classification GMM group, and a speaker classification data group as the classification result; an environment classifying unit configured to classify the generated speaker classification HMM group and speaker classification data group based on an environment, and to generate an environment classification data group as the classification result; and an acoustic model generating unit configured to perform environmental adaptation with respect to the generated environment classification data group and speaker classification HMM group, and to generate a binary tree-based environment centric hierarchical model including an environment classification HMM group and an environment classification GMM group as the performance result.

The speaker classifying unit may generate a speaker-independent GMM and a speaker-independent HMM based on the extracted cepstral data, may classify the cepstral data based on a speaker and generate a cepstral speaker classification data group as the classification result, may generate a spectral speaker classification data group based on the cepstral speaker classification data group corresponding to the same voice data as the extracted spectral data, may speaker-adapt the generated speaker-independent HMM to the cepstral speaker classification data group and generate a binary tree-based cepstral speaker classification HMM group as the performance result, and may generate a binary tree-based cepstral speaker classification GMM group using the cepstral speaker classification data group.

The environment classifying unit may transform the generated cepstral speaker classification HMM group to a spectral speaker classification HMM group through a domain transform operation, may generate a transform parameter for each data by spectral environment-adapting the spectral speaker classification data group to the spectral speaker classification data group corresponding to the same speaker classification, and may classify the generated transform parameter based on an environment and generate a cepstral environment classification data group corresponding to the same voice data as the classification result.

The acoustic model generating unit may cepstral environment-adapt the generated cepstral environment classification data group of the speaker classification to a cepstral speaker classification HMM corresponding to the same speaker classification and generate a binary tree-based environment centric hierarchical model including a cepstral environment classification GMM group and a cepstral environment classification HMM group as the performance result.

The voice recognizing means may include a feature extracting unit configured to extract the feature data of voice data received from the user; a model selecting unit configured to calculate a similarity between the extracted feature data and a pre-stored tree-based GMM, and to select the multiple models based on an HMM corresponding to a GMM, based on the calculation result; a parallel recognizing unit configured to perform viterbi-based parallel recognition with respect to the voice data based on the selected multiple models, a pre-stored pronunciation model, and a language model; and a recognition selecting unit configured to output a word string having the highest scores among multiple word strings that are output as the performance result.

The model selecting unit may calculate the similarity while performing traversal of a root node to a lower node of an acoustic model that is the binary tree-based GMM, and select corresponding multiple HMMs by repeating a process of deleting a model having a relatively low similarity and adding a model having a relatively high similarity until final N models are obtained in a descending order of the similarity as the calculation result.

Another exemplary embodiment of the present invention provides a method of recognizing voice using multiple acoustic models, the method comprising: storing voice data collected in various noise environments in voice data DB; performing classification for each speaker and environment based on the collected voice data, and generating an acoustic model of a binary tree structure as the classification result; and extracting feature data of voice data when the voice data is received from a user, selecting multiple models from the generated acoustic model based on the extracted feature data, parallel recognizing the voice data based on the selected multiple models, and outputting a word string corresponding to the voice data as the recognition result.

The performing may include: extracting the feature vector data to be two types of spectral data and cepstral data from the collected voice data; classifying the extracted feature vector data based on a speaker, and generating a binary tree-based speaker centric hierarchical model including a speaker classification HMM group, a speaker classification GMM group, and a speaker classification data group as the classification result; classifying the generated speaker classification HMM group and speaker classification data group based on an environment, and generating an environment classification data group as the classification result; and performing environmental adaptation with respect to the generated environment classification data group and speaker classification HMM group, and generating a binary tree-based environment centric hierarchical model including an environment classification HMM group and an environment classification GMM group as the performance result.

The generating the binary tree-based speaker centric hierarchical model may include: generating a speaker-independent GMM and a speaker-independent HMM based on the extracted cepstral data, performing speaker adaptation with respect to the generated speaker-independent GMM and speaker-independent HMM, and generating a binary tree-based cepstral speaker classification HMM group as the performance result, classifying the cepstral data based on a speaker and generating a cepstral speaker classification data group as the classification result, generating a spectral speaker classification data group that is classified in correspondence to the spectral data extracted from the same voice data as the generated cepstral speaker classification data group, generating a cepstral speaker classification GMM group by directly learning a speaker classification data group, and generating a cepstral speaker classification data group by speaker-adapting cepstral speaker classification data to a speaker-independent model.

The generating the environment classification data group may include: classifying the generated cepstral speaker classification HMM group and spectral speaker classification data group based on an environment and generating a cepstral environment classification data group as the classification result.

The generating the binary tree-based environment centric hierarchical model may include: performing environmental adaptation with respect to the generated cepstral environment classification data group and cepstral speaker classification HMM group and generating a binary tree-based environment centric hierarchical model including a cepstral environment classification GMM group and a cepstral environment classification HMM group as the performance result.

The outputting may include: extracting the feature data of voice data received from the user; calculating a similarity between the extracted feature data and pre-stored acoustic model, and selecting the multiple models based on the calculation result; performing viterbi-based parallel recognition with respect to the voice data based on the selected multiple models, a pre-stored pronunciation model, and a language model; and outputting a word string having the highest scores among multiple word strings that are output as the performance result.

The selecting may include: calculating the similarity while performing traversal of a root node to a lower node of the binary tree-based acoustic model, and repeating a process of deleting a model having a relatively low similarity and adding a model having a relatively high similarity until final N models are obtained in a descending order of the similarity as the calculation result.

According to exemplary embodiments of the present invention, by generating a clustered acoustic model configured as hierarchical classification according to a speaker and an environment based on voice data collected in various environments, by selecting multiple models from the generated acoustic model based on feature data of voice data received from a user, by performing parallel recognition based on the selected multiple models, and by outputting a selected word string as the parallel recognition result, it is possible to achieve performance improvement beyond limits of an existing real-time preprocessing and adaptation scheme that is performed using a single model.

The present invention may be configured to perform parallel recognition processing by quickly selecting multiple models and thus, may be applied to all of the online voice recognizing systems being currently serviced.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
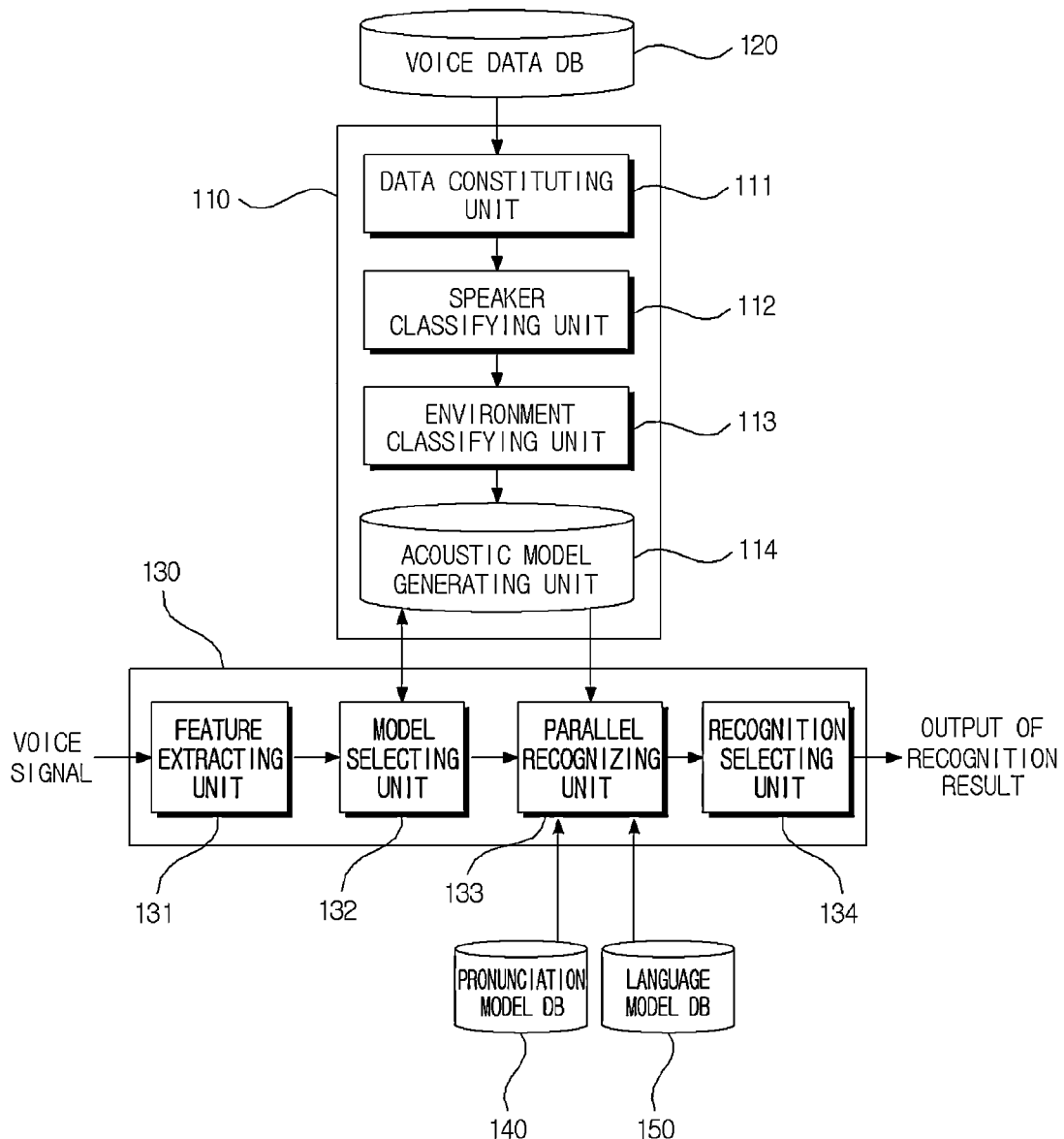
FIG. 1 illustrates an apparatus for recognizing voice using multiple acoustic models according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for recognizing voice using multiple acoustic models according to an exemplary embodiment of the present invention and a method thereof will be described with reference to FIGS. 1 to 6. A description will be made in detail based on a portion required to understand an operation and effect according to the present invention.

When describing constituent elements of the present invention, different reference numerals may be assigned based on drawings and like reference numerals may be assigned with respect to constituent elements with the same name, even though they are illustrated in different drawings. However, even in this case, it does not indicate that corresponding constituent elements have different functions based on exemplary embodiments, and does not indicate that the corresponding constituent elements have the same function in different exemplary embodiments. A function of each constituent element needs to be determined based on a description relating to each constituent element in a corresponding exemplary embodiment.

In particular, the present invention proposes a new voice recognizing method that generates a clustered acoustic model configured as hierarchical classification according to a speaker and an environment based on voice data collected in various environments, selects multiple models from the generated acoustic model based on feature data of voice data received from a user, performs parallel recognition based on the selected multiple models, and outputs a selected word string as the parallel recognition result.

FIG. 1 illustrates an apparatus for recognizing voice using multiple acoustic models according to an exemplary embodiment of the present invention.

As illustrated in FIG. 1, the apparatus for recognizing voice according to an exemplary embodiment of the present invention may include a model generating means 110, a voice data database (DB) 120, a voice recognizing means 130, a pronunciation model DB 140, and a language model DB 150.

The model generating means 110 may perform classification for each speaker and environment based on collected voice data, and may generate multiple acoustic models, for example, a speaker acoustic model, an environment acoustic model, and the like, as the classification result. Here, the collected voice data may be data in which environment noise of various conditions is mixed with respect to various speakers.

The model generating means 110 may include a data constituting unit 111, a speaker classifying unit 112, an environment classifying unit 113, and an acoustic model generating unit 114, which will be described with reference to FIGS. 2 and 3.

Figure 2:
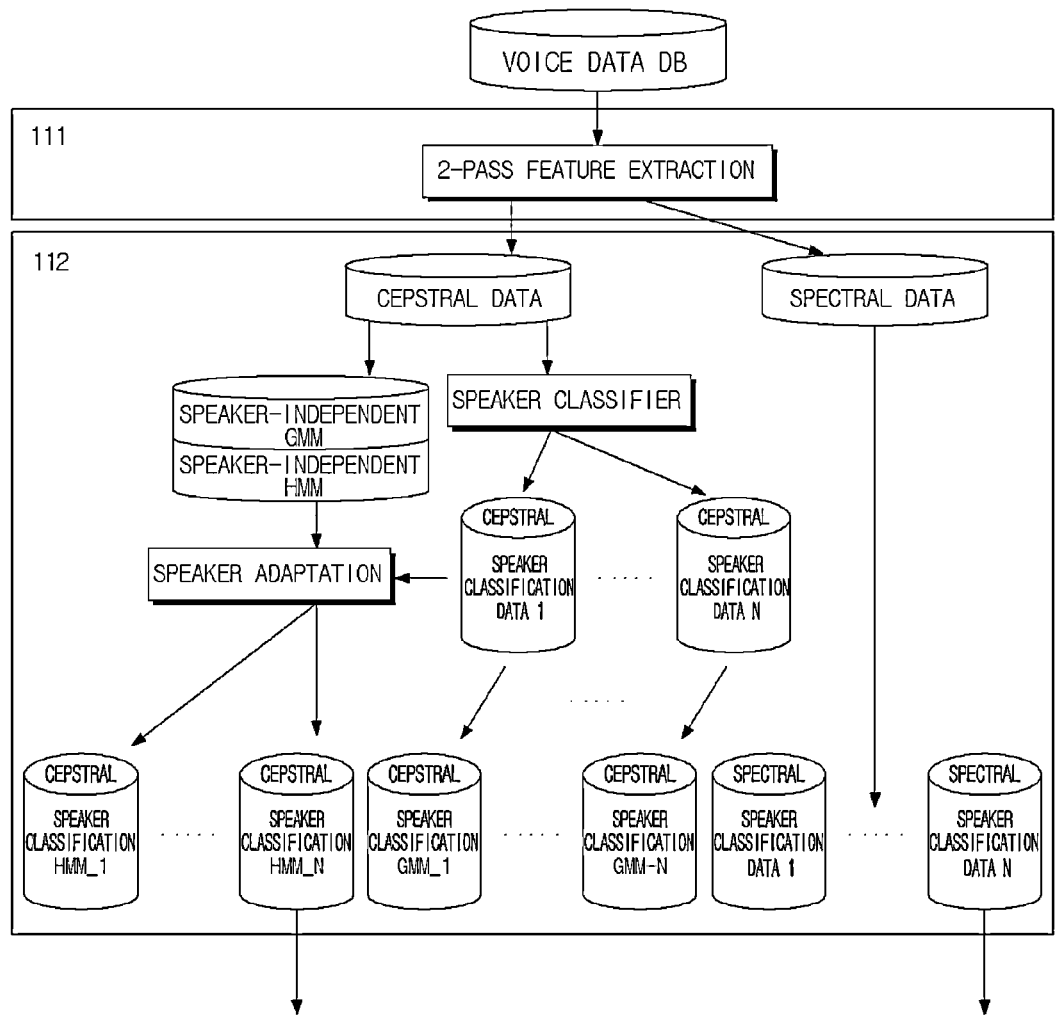
FIG. 2 illustrates a diagram to describe a principle of generating a speaker classification acoustic model according to an exemplary embodiment of the present invention.

FIG. 2 illustrates a diagram to describe a principle of generating a speaker classification acoustic model according to an exemplary embodiment of the present invention.

As illustrated in FIG. 2, the data constituting unit 111 may extract, from the collected voice data, feature vector data to be two types of spectral data and cepstral data.

The speaker classifying unit 112 may classify the extracted feature vector data based on a speaker and may generate a speaker centric hierarchical model, that is, a binary tree-based speaker classification hidden Markov model (HMM) group, speaker classification Gaussian mixture model (GMM) group, and speaker classification data group.

Hereinafter, it will be described in detail. Initially, the speaker classifying unit 112 generates a binary tree-based speaker classification HMM group by generating a speaker-independent GMM and a speaker-independent HMM based on the cepstral data, and by speaker-adapting the cepstral data to the generated speaker-independent HMM as the speaker classification data group that is classified by a speaker classifier. The speaker classifying unit 112 generates a binary tree-based speaker classification GMM group by directly learning each cepstral speaker classification data group.

The speaker classifying unit 112 generates a speaker classification GMM group by classifying a speaker based on the cepstral data. Here, the speaker classifying unit 112 may classify the speaker using, for example, an eigenVoice scheme, a GMM speaker classifying scheme, and the like.

Here, the well-known eigenVoice scheme may generate speaker-adapted HMMs by employing, to voice data, a speaker-independent model for each speaker, which is defined in an index, and then, generate a mean vector of each HMM as a matrix of super vectors obtained by multiplying an order, the number of mixtures, and the number of states, and induce eigenvectors through a primary component analysis (PCA) scheme of using a covariance matrix of the generated matrix.

The eigenvectors are referred to as eigenVoice. As shown in Equation 1, the above method assumes that mean vector $\hat{\mu}_{s,g}$ which "s" denotes a state of a predetermined speaker and "g" denotes a $g^{th}$ Gaussian may be expressed by mean vector $\mu_{s,g}$ of a speaker-independent model and a weight $w_k$ summation of the K number of eigenVoice $e_{s,g,k}$.

$$\hat{\mu}_{s,g} = \mu_{s,g} + \sum_{k=1}^{K} w_k e_{s,g,k} \quad \text{[Equation 1]}$$

Here, weights with respect to all of the speeches may be obtained using an eigenVoice Decomposition method. As shown in Equation 2, the weights may be obtained from an equation, which is partially differentiated using a weight, by inputting feature vector $x^t$ of a speech text having a frame length t into an auxiliary function Q(.) that is expressed together with the mean vector $\mu_{s,g}$ and variance $\Sigma_{s,g}$ of the speaker-independent model.

$$Q(\cdot) = -\frac{1}{2} \sum_s \sum_g \sum_t \gamma_{s,g}^t \left( x^t - \mu_{s,g} - \sum_{k=1}^{K} w_k e_{s,g,k} \right)^T \quad \text{[Equation 2]}$$

$$\Sigma_{s,g}^{-1} \left( x^t - \mu_{s,g} - \sum_{k=1}^{K} w_k e_{s,g,k} \right)$$

Here, $\gamma_{s,g}^t$ denotes a posterior probability of the state "s" and $g^{th}$ Gaussian in the frame t.

A speaker classification data tree is generated by dividing such weight distribution space using a binary classification scheme. A speaker classification HMM is generated by adapting, to the speaker-independent model, data that is classified in each tree. A speaker classification GMM is generated using the classified data. A binary classification tree of spectral data that is the same voice data index as cepstral data classified as a binary tree is generated.

Figure 3:
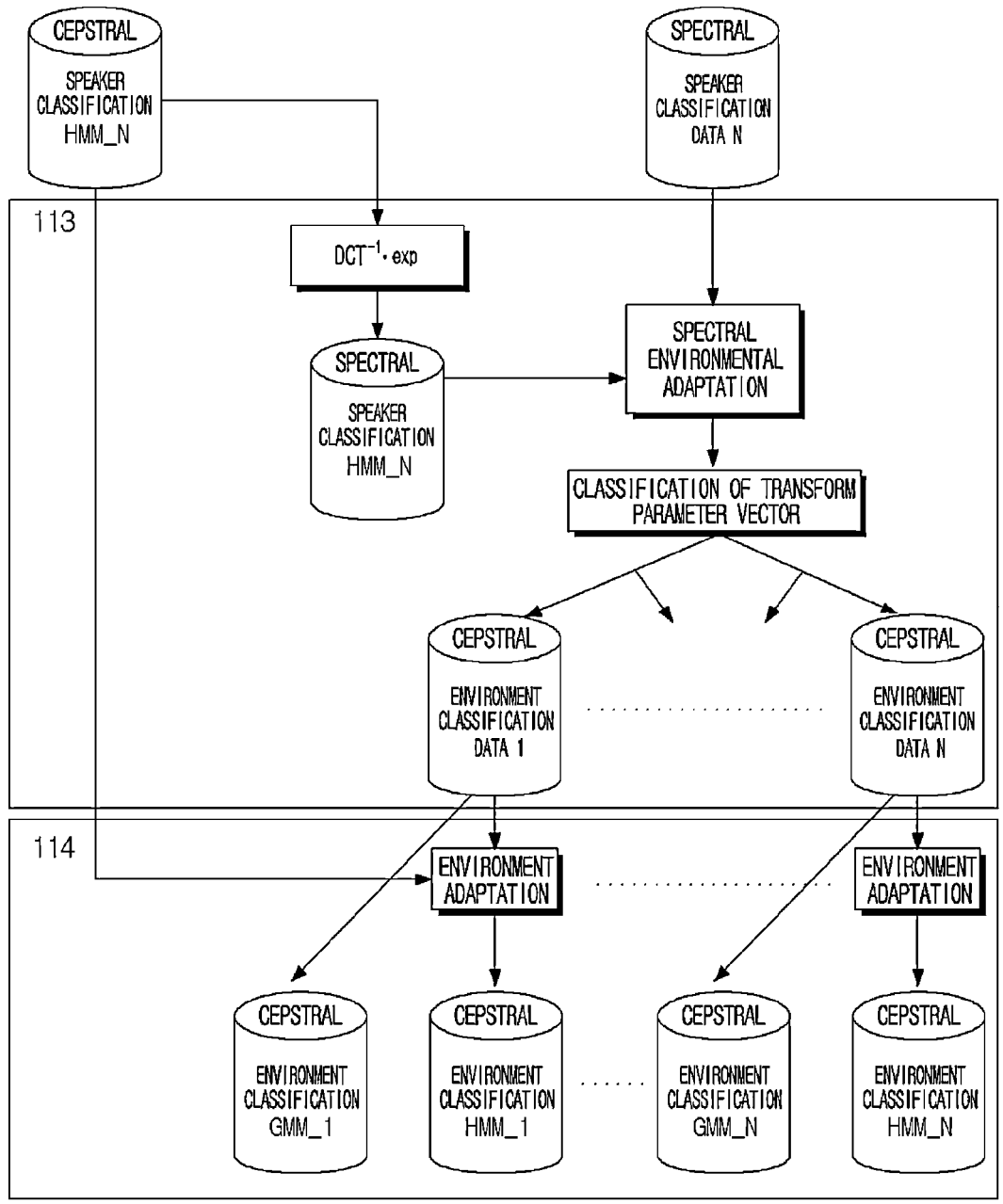
FIG. 3 illustrates a diagram to describe a principle of generating an environment classification acoustic model according to an exemplary embodiment of the present invention.

FIG. 3 illustrates a diagram to describe a principle of generating an environment classification acoustic model according to an exemplary embodiment of the present invention.

As illustrated in FIG. 3, the environment classifying unit 113 may generate a cepstral environment classification data group by classifying a cepstral speaker classification HMM group and a spectral speaker classification data group based on an environment.

The acoustic model generating unit 114 generates a binary tree-based environment centric hierarchical model, that is, a cepstral environment classification GMM group and a cepstral environment classification HMM group by performing environmental adaptation with respect to the generated cepstral environment classification data group and cepstral speaker classification HMM group.

Hereinafter, it will be described in detail. Initially, the environment classifying unit 113 generates the cepstral speaker classification HMM, classified as the binary tree, into the spectral speaker classification HMM through an inverse discrete cosine transform (DCT$^{-1}$) and exponential (exp) operation.

The environment classifying unit 113 generates a transform parameter by performing maximum likelihood linear regression (MLLR) environmental adaptation in a spectral domain based on the generated spectral speaker classification HMM and spectral speaker classification data that is each speech text.

As shown in Equation 3, mean vector $\mu^{spec}$ of the spectral speaker classification HMM may be expressed using an equation for generating mean vector $\hat{\mu}^{spec}$ in which noise is mixed using a combination of a channel noise factor component A matrix and an additive noise factor component b vector. Here, the noise-mixed mean vector $\hat{\mu}^{spec}$ may be arranged by changing the equation with an equation of noise factor transform matrix $\hat{W}$ and expanded mean vector $\xi$.

$$\hat{\mu}^{spec} = \hat{W}\xi = A\mu^{spec} + b \quad \text{[Equation 3]}$$

To know a noise characteristic of input data as above, the equation may be arranged by setting, as a noise component, a transform parameter of a model so as to be close to the input data. To obtain the transform parameter, an auxiliary function $\overline{Q}(.)$ that is a quadratic function may be defined to be similar to a method in which likelihood is extinguished in a spectral domain, as shown in Equation 4. When it is assumed that only a mean value of the model is affected, the noise component may be obtained through partial differentiation of the transform parameter $\hat{W}$ by arranging the equation using the auxiliary function as shown in Equation 4.

$$\overline{Q}(\cdot) = -\frac{1}{2} \sum_s \sum_g \sum_t \gamma_{s,g}^t [n\log(2\pi) + \quad \text{[Equation 4]}$$

$$\log|\Sigma_{s,g}| + (x^t - \hat{W}\xi_{s,g})' \Sigma_{s,g}^{-1} (x^t - \hat{W}\xi_{s,g})]$$

When it is assumed that a mean value and a variance value of the model are simultaneously affected, the noise component may be obtained through the partial differentiation of the transform parameter by arranging the equation as shown in Equation 5.

$$\overline{Q}(\cdot) = -\frac{1}{2} \sum_s \sum_g \sum_t \gamma_{s,g}^t [n\log(2\pi) + \log|A\Sigma_{s,g}A'| + \quad \text{[Equation 5]}$$

$$(x^t - (A\mu_{s,g} + b))' A^{-1'} \Sigma_{s,g}^{-1} A^{-1} (x^t - (A\mu_{s,g} + b))]$$

The acoustic model generating unit 114 configures a single long super vector using the transform parameter that is set as the obtained noise component, and generates the environment classification data group in a tree form using a Euclidean distance value and a binary classification scheme based on the configured super vector.

Here, the basic binary classification proceeds in the following manner.

1) Mean and standard deviation of group vectors are obtained, and two centroids are generated from the mean by the standard deviation.

2) A group is classified to be a closer side by calculating a Euclidean distance value with each vector based on two centroids.

3) New centroid is defined by obtaining a mean value from each of the two groups, and the process of 2) is repeated until a difference between the new centroid and the previous centroid becomes to be less than or equal to a reference value.

4) When previous classification is completed, and when the number of elements of each newly generated group is less than a reference value of variance distribution, the classification is suspended. Otherwise, a new start is performed by moving to the process of 1).

The acoustic model generating unit 114 generates the cepstral environment classification HMM by performing environmental adaptation based on the cepstral environment classification data group and the cepstral speaker classification HMM in the tree form, and generates the cepstral environment classification GMM by directly learning the environment classification data group.

Here, the acoustic model generating unit 114 performs environmental adaptation using a maximum a posterior (MAP) scheme or a maximum a posterior linear regression (MAPLR) scheme.

Figure 4:
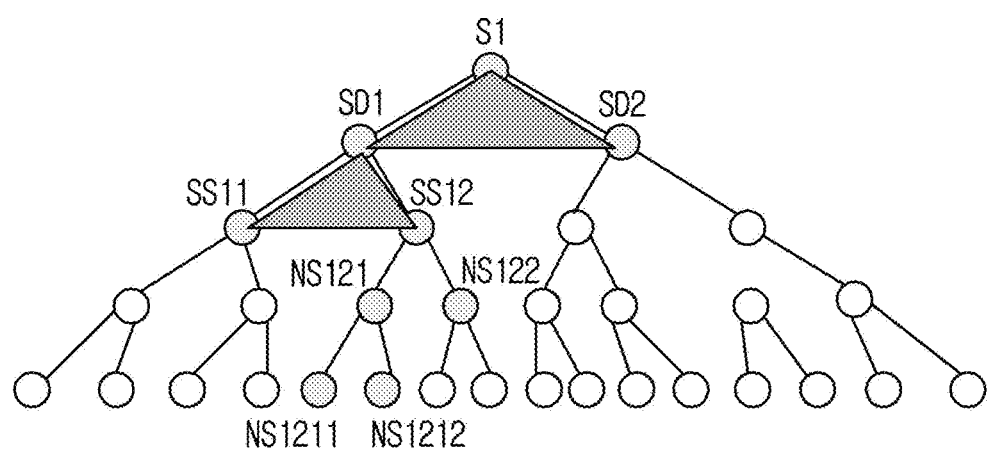
FIG. 4 illustrates an acoustic model configured as a binary tree according to an exemplary embodiment of the present invention.

FIG. 4 illustrates an acoustic model configured as a binary tree according to an exemplary embodiment of the present invention.

As illustrated in FIG. 4, the acoustic model generating unit 114 configures the generated clustered acoustic model as a binary tree. A root node becomes a speaker-independent model.

A lower node is binary classified into a speaker classification model. When the speaker classification model is not classified any more based on a classification reference value, the speaker classification model is binary classified into an environment classification model and is generated as the lower node.

A depth at which an intermediate node is classified into the lower node is individually determined based on the classification reference value.

The voice data DB 120 may store voice data collected in various noise environments, and may also store the clustered acoustic model generated based on the collected voice data.

The voice recognizing means 130 may extract feature data of voice data when the voice data is received from a user, select multiple models based on the extracted feature data and a pre-stored acoustic model, parallel recognize the voice data based on the selected multiple models, and output a word string corresponding to the voice data as the recognition result.

The voice recognizing means 130 may include a feature extracting unit 131, a model selecting unit 132, a parallel recognizing unit 133, and a recognition selecting unit 134, which will be described with reference to FIG. 5.

Figure 5:
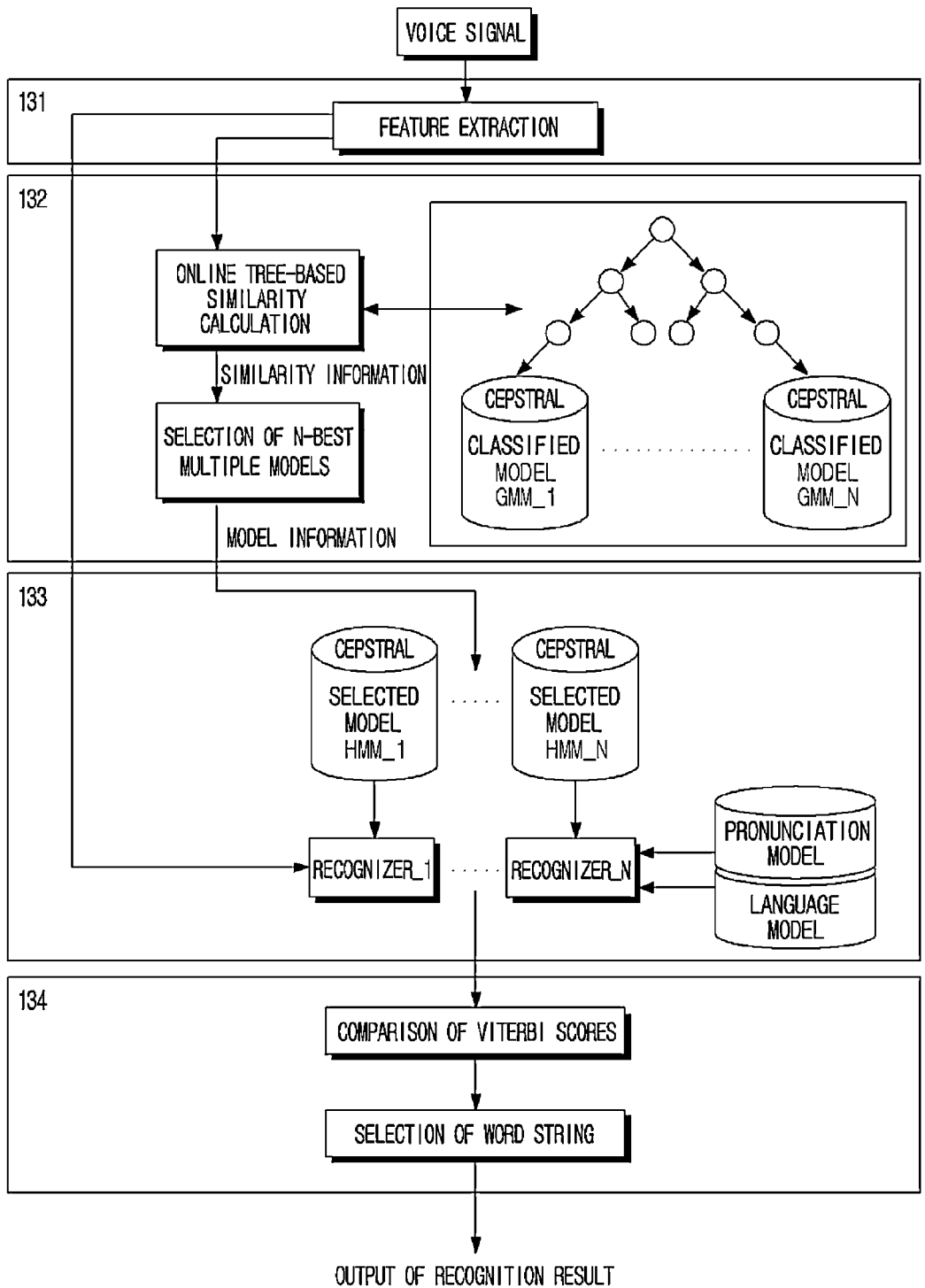
FIG. 5 illustrates a diagram to describe a voice recognizing process according to an exemplary embodiment of the present invention.

FIG. 5 illustrates a diagram to describe a voice recognizing process according to an exemplary embodiment of the present invention.

As illustrated in FIG. 5, when a voice signal or voice data is received from a user, the feature extracting unit 131 may extract feature data of the received voice data.

The model selecting unit 132 may calculate a similarity between the extracted feature data and a pre-stored acoustic model, and may select N multiple models based on the calculation result.

Hereinafter, it will be described in detail. Initially, when selecting suitable N multiple HMMs to perform recognition processing of data received from the user, the model selecting unit 132 needs to perform a similarity operation with tree-based GMMs that constitute pairs with HMMs. The present invention proposes a fast similarity calculation method to decrease an amount of time required for such recognition processing.

The similarity calculation method generally includes two methods. A top-down method proceeds in the following manner, as illustrated in FIG. 4.

1) The top-down method starts from a root node and simultaneously proceeds with similarity calculation between a center node and two lower nodes, and lists up corresponding nodes to an N-best list in a descending order of the similarity.

2) When the N-best list is insufficient, the process of 1) is repeated in the lower nodes. When the N-best list is sufficient and when a similarity of the center node is higher in the similarity calculation, the following progress will be suspended. On the other hand, when the N-best list is sufficient and when a similarity of a lower node is higher, the process of 1) is repeated only with respect to lower nodes that are included in the N-best list.

The N-best method proceeds using a method of deleting a model having a relatively low similarity and adding a model having a relatively high similarity while performing traversal with respect to a lower node, until final N models are obtained in a descending order of the similarity. The top-down method calculates the similarity using the entire frame of input data.

Another method, that is, a bottom-up method calculates a similarity with respect to the entire models per frame based on the entire models of a tree classification model including a speaker-independent model, lists up corresponding models to an N-best list, and discards models having a similarity lower than or equal to a reference value that is reduced from a similarity value of an $N^{th}$ list at predetermined intervals. The bottom-up method gradually increases the reference value to be close to an $N^{th}$ similarity value while updating the N-best list per frame. The bottom-up method is a method of selecting the N-best model from the final frame.

The parallel recognizing unit 133 may perform viterbi-based parallel recognition with respect to voice data based on the selected multiple models, a pre-stored pronunciation model, and a language model.

The recognition selecting unit 134 may output a word string having relatively high comparison scores among multiple word strings that are recognized as the performance result. That is, the recognition selecting unit 134 compares accumulative viterbi scores for each arc in parallel recognition based on a language model network, that is, a pronunciation model and a language model, and outputs a word string having the highest viterbi scores as the comparison result.

The pronunciation model DB 140 may store the pronunciation model, and the language model DB 150 may store the language model.

Figure 6:
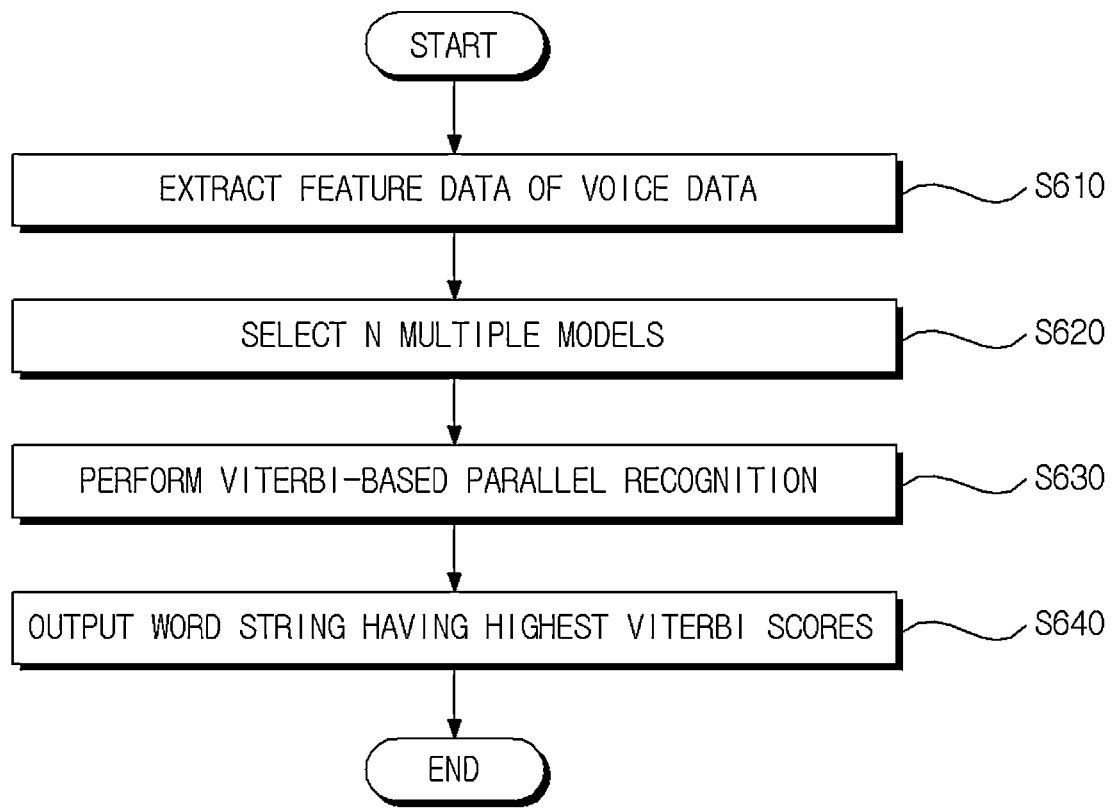
FIG. 6 illustrates a method of recognizing voice using multiple acoustic models according to an exemplary embodiment of the present invention.

FIG. 6 illustrates a method of recognizing voice using multiple acoustic models according to an exemplary embodiment of the present invention.

As illustrated in FIG. 6, when voice data is received from a user, an apparatus (hereinafter, referred to as a voice recognizing apparatus) for recognizing voice according to the present invention may extract feature data of the received voice data (S610).

Next, the voice recognizing apparatus may calculate a similarity between the extracted feature data and a pre-stored acoustic model, and select N multiple models based on the calculation result (S620).

Next, the voice recognizing apparatus may perform viterbi-based parallel recognition with respect to the voice data based on the selected multiple models, a pre-stored pronunciation model, and a language model (S630).

Next, the voice recognizing apparatus may compare viterbi scores of each of the multiple word strings that are recognized as the performance result, and may output a word string having the highest viterbi scores as the comparison result (S640).

Meanwhile, even though all of the constituent elements constituting the aforementioned exemplary embodiments of the present invention are described to be combined into one or to operate through combination therebetween, the present invention is not limited to the exemplary embodiments. That is, without departing from the scope of the present invention, all of the constituent elements may be selectively combined into at least one and thereby operate. Even though each of all of the constituent elements may be configured as single independent hardware, a portion of or all of the constituent elements may be selectively combined and thereby configured as a computer program having a program module to perform a portion of or all of the functions combined in single or a plurality of items of hardware. The computer program may be stored in computer-readable media such as a universal serial bus (USB) memory, a CD disk, a flash memory, and the like, and thereby be read and executed by a computer, thereby embodying the exemplary embodiments of the present invention. The computer-readable media of the computer program may include magnetic storage media, optical storage media, carrier wave media, and the like.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for recognizing voice using multiple acoustic models, the apparatus comprising:
   a voice data database (DB) configured to store voice data collected in various noise environments;
   a model generating means configured to perform classification for each speaker and environment based on the collected voice data, and to generate a Gaussian mixture model (GMM) acoustic model for calculating a similarity and a hidden Markov model (HMM) acoustic model for recognizing voice of a binary tree structure as the classification result; and
   a voice recognizing means configured to extract feature data of voice data when the voice data is received from a user, to select multiple models from the generated HMM acoustic model using the generated GMM acoustic model based on the extracted feature data, to parallel recognize the voice data based on the selected multiple models, and to output a word string corresponding to the voice data as the recognition result,
   wherein the voice recognizing means calculates a similarity between the extracted feature data and the generated GMM acoustic model and HMM acoustic models, and repeats a process of selecting a model until final N models are obtained in a descending order of the similarity.

2. The apparatus of claim 1, wherein the model generating means comprises:
   a data constituting unit configured to extract, from the collected voice data, feature vector data to be two types of spectral data and cepstral data;
   a speaker classifying unit configured to classify the extracted feature vector data based on a speaker, and to generate a binary tree-based speaker centric hierarchical model including a speaker classification HMM group, a speaker classification GMM group, and a speaker classification data group as the classification result;
   an environment classifying unit configured to classify the generated speaker classification HMM group and speaker classification data group based on an environment, and to generate an environment classification data group as the classification result; and
   an acoustic model generating unit configured to perform environmental adaptation with respect to the generated environment classification data group and speaker classification HMM group, and to generate a binary tree-based environment centric hierarchical model including an environment classification HMM group and an environment classification GMM group as the performance result.

3. The apparatus of claim 2, wherein the speaker classifying unit
   generates a speaker-independent GMM and a speaker-independent HMM based on the extracted cepstral data, performs speaker adaptation with respect to the generated speaker-independent GMM and speaker-independent HMM, and generates a binary tree-based cepstral speaker classification HMM group as the performance result,
   classifies the cepstral data based on a speaker and generates a cepstral speaker classification data group as the classification result, and
   generates a spectral speaker classification data group that is classified in correspondence to the spectral data extracted from the same voice data as the generated cepstral speaker classification data group, generates a cepstral speaker classification GMM group by directly learning a speaker classification data group, and generates a cepstral speaker classification data group by speaker-adapting cepstral speaker classification data to a speaker-independent model.

4. The apparatus of claim 3, wherein the environment classifying unit classifies the generated cepstral speaker classification HMM group and spectral speaker classification data group based on an environment and generates a cepstral environment classification data group as the classification result.

5. The apparatus of claim 4, wherein the acoustic model generating unit performs environmental adaptation with respect to the generated cepstral environment classification data group and cepstral speaker classification HMM group and generates a binary tree-based environment centric hierarchical model including a cepstral environment classification GMM group and a cepstral environment classification HMM group as the performance result.

6. The apparatus of claim 1, wherein the voice recognizing means comprises:
   a feature extracting unit configured to extract the feature data of voice data received from the user;
   a model selecting unit configured to calculate a similarity between the extracted feature data and a pre-stored GMM acoustic model, and to select the multiple models from the generated HMM acoustic model based on the calculation result;
   a parallel recognizing unit configured to perform viterbi-based parallel recognition with respect to the voice data based on the selected multiple models, a pre-stored pronunciation model, and a language model; and a recognition selecting unit configured to output a word string having the highest scores among multiple word strings that are output as the performance result.

7. The apparatus of claim 6, wherein the model selecting unit calculates the similarity while performing traversal of a root node to a lower node of a binary tree-based acoustic model, and repeats a process of deleting a model having a relatively low similarity and adding a model having a relatively high similarity until final N models are obtained in a descending order of the similarity as the calculation result.

8. A method of recognizing voice using multiple acoustic models, the method comprising:
storing voice data collected in various noise environments in voice data DB;
performing classification for each speaker and environment based on the collected voice data, and generating a Gaussian mixture model (GMM) for calculating a similarity and a hidden Markov model (HMM) for recognizing voice of a binary tree structure as the classification result; and
extracting feature data of voice data when the voice data is received from a user;
selecting multiple models from the generated HMM acoustic model using the generated GMM acoustic model based on the extracted feature data;
calculating a similarity between the extracted feature data and the generated GMM acoustic model and HMM acoustic models;
parallel recognizing the voice data based on the selected multiple models;
repeating a process of selecting a model until final N models are obtained in a descending order of the similarity; and
outputting a word string corresponding to the voice data as the recognition result.

9. The method of claim 8, wherein the performing comprises:
extracting the feature vector data to be two types of spectral data and cepstral data from the collected voice data;
classifying the extracted feature vector data based on a speaker, and generating a binary tree-based speaker centric hierarchical model including a speaker classification HMM group, a speaker classification GMM group, and a speaker classification data group as the classification result;
classifying the generated speaker classification HMM group and speaker classification data group based on an environment, and generating an environment classification data group as the classification result; and
performing environmental adaptation with respect to the generated environment classification data group and speaker classification HMM group, and generating a binary tree-based environment centric hierarchical model including an environment classification HMM group and an environment classification GMM group as the performance result.

10. The method of claim 9, wherein the generating the binary tree-based speaker centric hierarchical model comprises:
generating a speaker-independent GMM and a speaker-independent HMM based on the extracted cepstral data,
performing speaker adaptation with respect to the generated speaker-independent GMM and speaker-independent HMM, and generating a binary tree-based cepstral speaker classification HMM group as the performance result,
classifying the cepstral data based on a speaker and generating a cepstral speaker classification data group as the classification result, and
generating a spectral speaker classification data group that is classified in correspondence to the spectral data extracted from the same voice data as the generated cepstral speaker classification data group, generating a cepstral speaker classification GMM group by directly learning a speaker classification data group, and generating a cepstral speaker classification data group by speaker-adapting cepstral speaker classification data to a speaker-independent model.

11. The method of claim 10, wherein the generating the environment classification data group comprises:
classifying the generated cepstral speaker classification HMM group and spectral speaker classification data group based on an environment and generating a cepstral environment classification data group as the classification result.

12. The method of claim 11, wherein the generating the binary tree-based environment centric hierarchical model comprises:
performing environmental adaptation with respect to the generated cepstral environment classification data group and cepstral speaker classification HMM group and generating a binary tree-based environment centric hierarchical model including a cepstral environment classification GMM group and a cepstral environment classification HMM group as the performance result.

13. The method of claim 8, wherein the outputting comprises:
extracting the feature data of voice data received from the user;
calculating a similarity between the extracted feature data and pre-stored GMM acoustic model, and selecting the multiple models from the generated HMM acoustic model based on the calculation result;
performing viterbi-based parallel recognition with respect to the voice data based on the selected multiple models, a pre-stored pronunciation model, and a language model; and
outputting a word string having the highest scores among multiple word strings that are output as the performance result.

14. The method of claim 13, wherein the selecting comprises:
calculating the similarity while performing traversal of a root node to a lower node of a binary tree-based acoustic model, and repeating a process of deleting a model having a relatively low similarity and adding a model having a relatively high similarity until final N models are obtained in a descending order of the similarity as the calculation result.

* * * * *